Sept. 13, 1949.     D. N. WALKER ET AL     2,481,547
GAS TURBINE MOUNTING
Filed Aug. 21, 1945     2 Sheets-Sheet 2
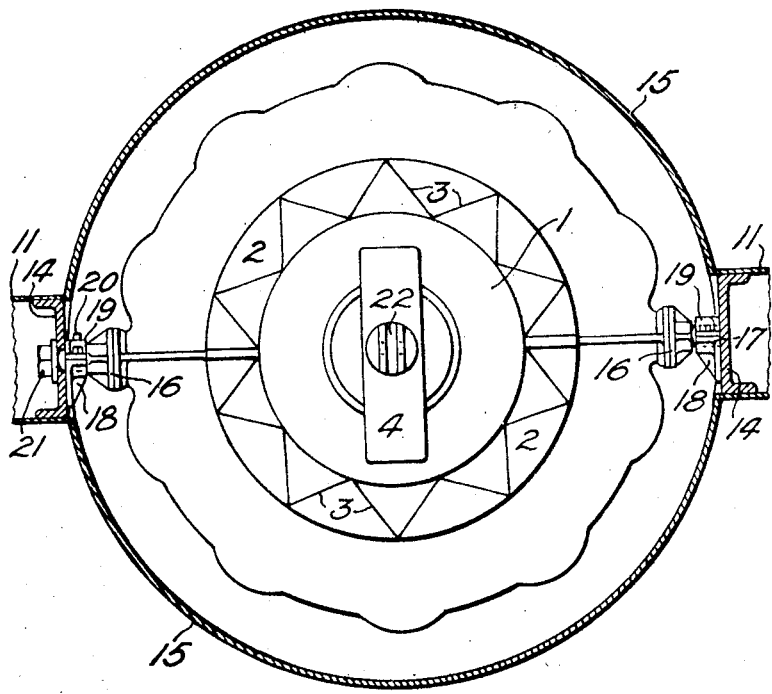
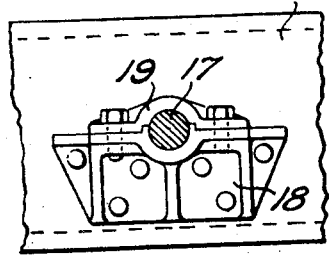
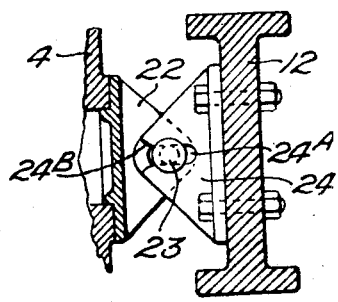
Inventors
Daniel Norman Walker
William Evelyn Patrick Johnson
By Stevens and Davis
their Attys Patented Sept. 13, 1949

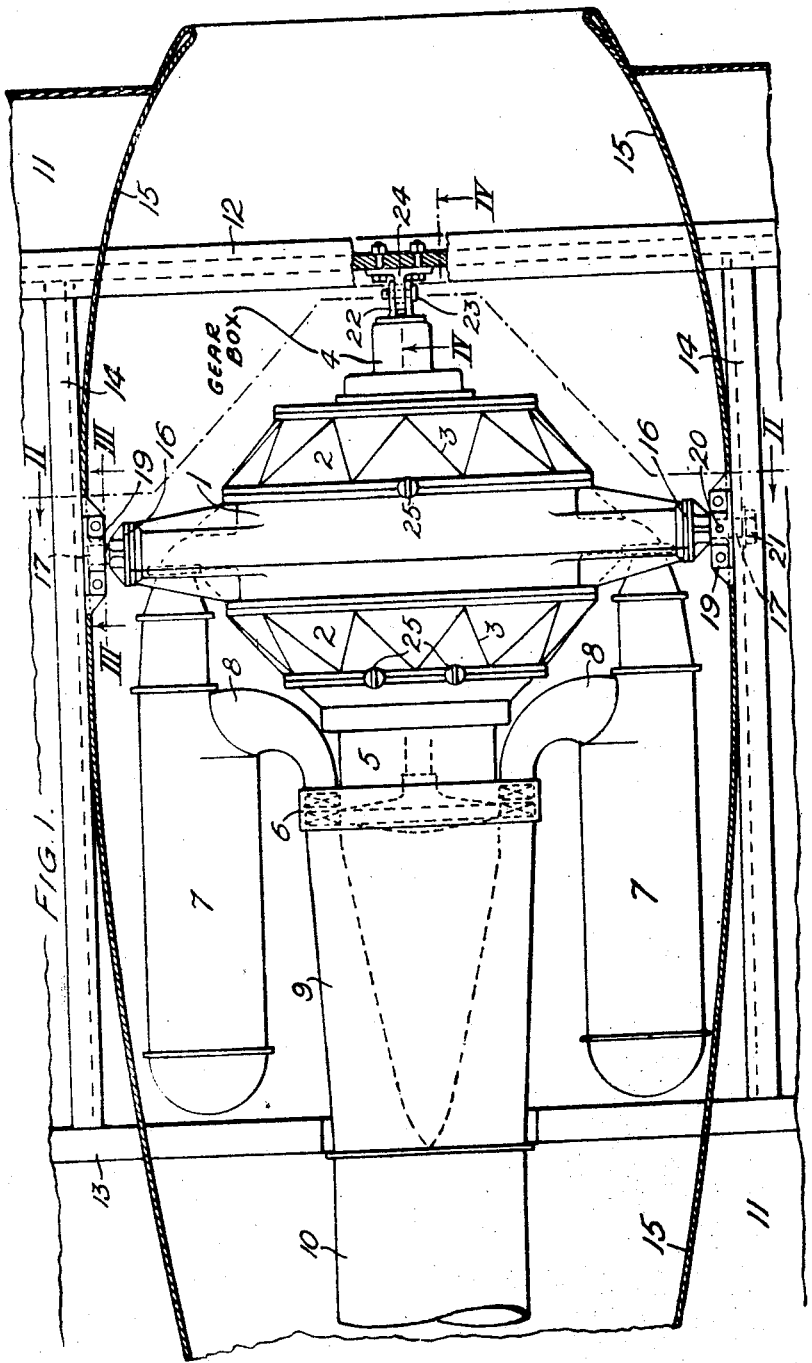

2,481,547

UNITED STATES PATENT OFFICE 2,481,547

GAS TURBINE MOUNTING

Daniel Norman Walker, Ashby Parva, near Rugby, and William Evelyn Patrick Johnson, Hampstead, London, England, assignors to Power Jets (Research and Development) Limited, London, England Application August 21, 1945, Serial No. 611,742 In Great Britain February 14, 1942

Section 1, Public Law 690, August 8, 1946 Patent expires February 14, 1962

14 Claims. (Cl. 60—41)

1

This invention relates to mountings for power plant for jet reaction propulsion and of the kind comprising a compressor, a combustion arrangement receiving the air output from the compressor and adapted to burn fuel therein, and a gas-turbine driven by the hot air and gases from the combustion arrangement and itself driving the compressor and exhausting rearwardly the whole arranged more or less symmetrically about a main fore and aft axis. In general it may be assumed that such a power plant or unit (hereinafter designated "power plant of the kind stated") comprises a more or less rigid and robust structure of parts which have to resist higher mechanical loads (such as the compressor casing, bearing housings, turbine casing, and gearing, bearing housings, turbine casing, and gearing box for auxiliary drives), all of which have to be held in rigid alignment and relation and have to be solidly built; and the combustion arrangement which may be of relative light and flexible nature e. g. of sheet metal work subject to great and rapid temperature changes, and in general ill-adapted to transmit large mechanical loads or to remain in very precise relationship with the more rigid parts. The exhaust ducting is likely to be of the same relatively light and flexible nature. In aircraft installations it is necessary for power unit mountings to resist forces operating in all six degrees (viz: the three linear and three angular degrees) the main forces to be coped with being those due to the weight of the unit, its thrust, gyroscopic forces, and inertia forces during bodily accelerations in any of the six degrees. The somewhat large thermal expansions and contractions of the units structure have also to be taken into account in contriving a suitable mounting.

In the following description and statement of claim reference is made to "trunions." Whilst it is believed that this term will be quite clear from the context, it is desired to make it clear that we use the term to mean a fitting or support which in its nature permits angular freedom about an axis, and it may comprise a journal (as described herein) or an element with a bore to receive a journal.

According to the invention a power unit of the kind stated is adapted to be mounted by the provision of a pair of substantially co-axial trunions attached to or integral with a structural part of the unit adapted to transmit major loads between the unit and the structure which is to support it (e. g. the aircraft) and a third attachment adapted to constrain the unit against rotation about the trunnion axis, the arrange-

2 ment thus being such that the trunnions restrain relative movement between the unit and aircraft in five degrees of freedom, and the third attachment in the sixth degree, i. e. that of rotation about the trunnion. One of the pair of trunnions is preferably adapted to resist movement along the trunnion axis whilst the other is free in this sense so as to allow for expansions or minor inaccuracies of construction without sacrificing relatively precise location of the unit as a whole. The third attachment is preferably so constructed as to permit some freedom of movement except in the sense in which it is required to exercise constraint. The trunnion axis is preferably arranged to intersect the main fore and aft axis of the unit at a point as near as may be practicable to the centre of gravity of the unit. Any or all of the attachments may be adapted for adjustment for example by the provision of eccentric and rotatable adjustable bushes or by making the trunnions or pin eccentric and adjustable relative to their anchorages or by other simple means. The invention embraces power units adapted as outlined above and aircraft adapted to receive them.

The invention will now be described with reference to the accompanying drawings in which Fig. 1 is a diagrammatic plan view of an example of power plant of the kind stated, installed in a nacelle of an aircraft. Fig. 2 is a front elevation of the same in section on the line II, II of Fig. 1. Fig. 3 is an enlarged view partly in section on the line III, III of Fig. 1 and Fig. 4 a similar scrap view in section on the line IV, IV of Fig. 1.

The power unit comprises a centrifugal compressor the casing of which is shown at 1 with bilateral air intakes at 2 spanned by rigid lattice construction indicated diagrammatically at 3, an auxiliary drive gear box 4 at the forward end, a rear bearing housing 5 and gas turbine with casing 6. The whole of these components constitute the main virtually rigid structural part of the unit; in addition a combustion arrangement consists of light sheet metal air casings 7 receiving the air output from the compressor casing 1 and delivering combustion products through sheet metal ducts 8 to the turbine, which exhausts through the sheet metal duct 9 to the final propelling jet pipe 10.

The relevant airframe parts which are indicated diagrammatically comprise a wing with a front spar 12 and rear spar 13 interconnected by fore and aft ribs 14, the nacelle itself is represented by a sheet metal skin 15.

Flat faces are machined on the compressor casing 1, at 16, and fittings are attached thereto by bolts (not shown) from which fittings project radially and co-axially a pair of trunnion bosses 17 which in this case are slotted cylindrical journals. These are adapted to be received by bearing-like fittings comprising a lower part 18 permanently attached to the ribs 14 and detachable caps 19 bolted thereto. One of the trunnion bosses 17 is located in respect of movement along the trunnion axis in the aircraft fitting 18, 19, for example by a transverse pin indicated at 20 (Fig. 1) and/or by a nut or equivalent indicated at 21. The other trunnion is left free to slide axially in its corresponding fitting 18, 19, and suitable end clearance is provided for this purpose. The unit as a whole is thus located from the fixed trunnion but it will be seen that it is constrained by the two trunnions in all degrees except that of angular movement about the trunnion axis. Rubber or like resilient bushing may be provided for the trunnions.

A third attachment is provided at the extreme forward end of the unit. This consists of a fork fitting 22 bolted to the gearbox 4 and holding a short horizontal pin 23 which is adapted to be threaded through and to engage in a slot 24A provided in a fitting 24 which is bolted to the front spar 12. The slot 24A is disposed horizontally fore and aft and the pin 23 is a close fit therein for vertical constraint; thus this attachment constrains the unit about the trunnion axis completing its constraint in all six degrees. If it be desired to have the pin 23 permanently in the fitting 22 so that there is nothing to be detached at this point during installation or removal of the unit, the slot 24A is open at its rear end as indicated at 24B so that by moving the unit slightly rearwardly the pin 23 disengages from the slot. In this case therefore in installing the unit the main attachments are effected simply by dropping the unit into the nacelle: tilting it slightly to engage the pin 23 in the slot and moving the unit slightly forwards at the same time further dropping it until the trunnion 17 sits in the fittings 18, and finally replacing the caps 19. The unit is then completely held and the necessary pipe connections etc. complete the installation. The unit is provided with suitable lifting points such as eyebolts indicated at 25.

In the example shown it would be found that the centre of gravity of the unit is in fact a short distance aft of the trunnion axis, which intersects the main axis of the unit; thus, in static conditions the front attachment resists an upward load. It would, however, be possible to shift the trunnions further aft if it were desirable to build out suitable structural extensions either from the compressor casing 1 or from the rear lattice work at 2 or bearing housing 5 but in general this will not be found necessary if the particular form of the unit under consideration is substantially as illustrated. It may perhaps be mentioned that in the diagrammatic illustrations no auxiliary components have been shown on the gear box 4, but it is to be supposed that these will be present as more or less permanent components of the unit and it will be seen that they do not interfere with the manner of mounting the unit as above described.

The compressor casing 1 may for manufacturing reasons have joints and if for example the casing is built of four parts namely upper and lower front and rear portions four joints may run together at a point which will lie in the machined face at 16, so that the trunnion fittings may be made use of not only to afford strength at this somewhat awkward junction, but also to seal the joints against air leakage.

We claim:
1. A power unit comprising a compressor, combustion means, and a gas turbine all disposed as a symmetrical arrangement on the common axis of the compressor and turbine, adapted to be mounted by the provision of means comprising a pair of substantially coaxial trunnions on a structural part of said unit adapted to transmit major loads to or from such structural part while permitting freedom of movement to said structural part at least in one direction along the trunnion axis, and a third attachment in spaced relationship to the trunnion axis adapted to constrain said structural part against angular motion about said axis while permitting freedom of movement to said structural part along a line passing through said axis and said further attachment.

2. A power unit comprising a compressor, combustion means, and a gas turbine all disposed as a symmetrical arrangement on the common axis of the compressor and turbine, adapted to be mounted by means comprising a trunnion extending substantially radially (as referred to the axis of symmetry of said unit) from a structural part of said unit, a second trunnion arranged likewise, oppositely extending substantially coaxially with the other trunnion, said trunnions being constructed to permit freedom of movement to said structural part at least in one direction along the trunnion axis, and further attachment means adapted to constrain the unit against angular motion about the common axis of said trunnions while permitting freedom of movement to said structural part along a line passing through said axis and said further attachment.

3. A power unit comprising a compressor, combustion means, and a gas turbine all disposed as a symmetrical arrangement on the common axis of the compressor and turbine, adapted to be mounted by means comprising a pair of substantially coaxial trunnions on a structural part of said unit adapted to transmit major loads to or from such structural part, complementary trunnion engaging means to cooperate journalwise with said trunnions, means for axially locating one of said trunnions with respect to its complementary engaging means, means permitting axial movement of the other trunnion, and further attachment means adapted to constrain the unit against angular motion about the common axis of said trunnions while permitting freedom of movement to said structural part along a line passing through said axis and said further attachment.

4. A power unit comprising a compressor, combustion means, and a gas turbine all disposed as a symmetrical arrangement on the common axis of the compressor and turbine, adapted to be mounted by means comprising a pair of substantially coaxial trunnions on a structural part of said unit adapted to transmit major loads to or from such structural part and aligned substantially on a common diameter of such structural part, supporting means to cooperate with said trunnions to support them journalwise, means to locate the unit relative to one of said supporting means and to leave it free for movement relative to the other in the axial sense of said trunnions, and further attachment means spaced from said diameter and effectively on the axis of symmetry of the unit to constrain the unit against angular motion about said diameter while permitting movement of the unit in the direction of said axis of symmetry.

5. A power unit comprising a compressor, combustion means, and a gas turbine all disposed as a symmetrical arrangement on the common axis of the compressor and turbine, having for its mounting a pair of circular sectioned trunnion bosses extending oppositely from the casing of the compressor on a common diameter, and further attachment means spaced from said diameter and permitting freedom of movement to said structural part at least in one direction along the trunnion axis and adapted to constrain the unit against angular motion about said diameter while permitting freedom of movement to said structural part along a line passing through said axis and said further attachment.

6. A power unit according to claim 5 wherein said further attachment means is located at the forward end of said unit.

7. A power unit comprising a compressor, a gas turbine coaxial therewith, and combustion means disposed symmetrically about the axis thereof and enclosing a major portion of the compressor-turbine structure, said turbine exhausting rearwardly and along said axis for jet propulsion, a pair of trunnions extending oppositely from the casing of said compressor on a common diameter and permitting freedom of movement to said structural part at least in one direction along the trunnion axis, and further attachment means to constrain the unit against angular motion about said diameter and not otherwise to constrain it.

8. A power unit according to claim 7, in combination with an aircraft provided with means complementary to said trunnions and attachment means whereby said unit is supported in said aircraft in all six senses.

9. A jet propulsion power plant for aircraft comprising a centrifugal compressor, a gas turbine coaxial therewith, combustion means disposed symmetrically about the axis thereof and enclosing a major portion of the compressor-turbine structure, an exhaust duct extending coaxially and rearwardly from said turbine, a pair of trunnion bosses extending from the compressor casing on a common diameter and adapted to transmit major loads between the power plant and an aircraft, and further attachment means to interattach the plant and the aircraft and permitting freedom of movement to said compressor casing at least in one direction along the trunnion axis and to prevent relative motion therebetween about said diameter while permitting freedom of movement to said power plant along a line passing through said diameter and said further attachment.

10. Plant according to claim 9, in which one of said trunnions is adapted to be located axially in relation to said aircraft whilst the other has axial freedom sufficient for thermal changes of dimension.

11. Plant according to claim 9 in which said compressor is a bilateral entry compressor, and in which the further attachment means is afforded by structure on the radially inner part of the forward side of the compressor.

12. A gas turbine power plant installation comprising the combination with a gas turbine power unit having a compressor, combustion means, and a turbine all symmetrically disposed about a common axis which is also the rotational axis of the compressor and turbine, of supporting means including trunnions at diametrically opposite points of the compressor stationary structure, said trunnions being constructed to permit pure rotation of the power unit about, and also its expansive movement along, the trunnion axis but otherwise substantially sustaining all major loads of the unit, and reaction means preventing such rotation of the power unit while permitting expansive movement thereof along the axis of symmetry, but not otherwise substantially sustaining any major load.

13. A gas turbine power plant installation comprising the combination with a gas turbine power unit having a compressor, combustion means, and a turbine all symmetrically disposed about a common axis which is also the rotational axis of the compressor and turbine, and having a concentration of mass such that the center of gravity of the unit lies in a plane in the neighborhood of the compressor; of supporting means including trunnions at diametrically opposite points of the compressor stationary structure, said trunnions being constructed to permit pure rotation of the power unit about, and also its expansive movement along, the trunnion axis but otherwise substantially sustaining all major loads of the unit; and reaction means preventing such rotation of the power unit while permitting expansive movement thereof along the axis of symmetry, but not otherwise substantially sustaining any major load.

14. A gas turbine power plant installation comprising the combination with a gas turbine power unit having a compressor, a turbine spaced coaxially from and forming a rigid unit with the compressor and drivingly connected therewith, and combustion means transmitting the output of the compressor to the turbine and forming a structure substantially enclosing the space between these elements, the whole having a concentration of mass such that the center of gravity of the unit lies in a plane in the neighborhood of the compressor; of supporting means including trunnions at diametrically opposite points of the compressor stationary structure, said trunnions being constructed to permit pure rotation of the power unit about, and also its expansive movement along, the trunnion axis but otherwise substantially sustaining all major loads of the unit; and reaction means preventing such rotation of the power unit while permitting expansive movement thereof along the axis of symmetry, but not otherwise substantially sustaining any major load.

DANIEL NORMAN WALKER.
WILLIAM EVELYN PATRICK JOHNSON.

REFERENCES CITED

The following references are of record in the file of this patent:

UNITED STATES PATENTS

| Number | Name | Date |
| --- | --- | --- |
| 2,196,563 | Neugebauer | Apr. 9, 1940 |
| 2,404,334 | Whittle | July 16, 1946 |

FOREIGN PATENTS

| Number | Country | Date |
| --- | --- | --- |
| 818,703 | France | June 21, 1937 |

OTHER REFERENCES

Ser. No. 288,972, Julien et al. (A. P. C.) pub. May 25, 1943.

Certificate of Correction

September 13, 1949

Patent No. 2,481,547

DANIEL NORMAN WALKER ET AL.

It is hereby certified that errors appear in the printed specification of the above numbered patent requiring correction as follows:

Column 2, line 5, after the word "trunnion" and before the period insert *axis*; column 5, lines 13, 14 and 15, strike out "and permitting freedom of movement to said structural part at least in one direction along the trunnion axis" and insert the same after "diameter" and before the comma in line 11, same column; lines 53, 54, 55 and 56, strike out "and permitting freedom of movement to said compressor casing at least in one direction along the trunnion axis" and insert the same after "aircraft" and before the comma, in line 52, same column;

and that the said Letters Patent should be read with these corrections therein that the same may conform to the record of the case in the Patent Office.

Signed and sealed this 17th day of January, A. D. 1950.

[SEAL]

THOMAS F. MURPHY,
*Assistant Commissioner of Patents.*